(12) United States Patent
Arlemark et al.

(10) Patent No.: US 10,136,768 B2
(45) Date of Patent: Nov. 27, 2018

(54) DISPENSER WITH METAL SHEET OUTER SURFACE, SUPPORT STRUCTURE, METAL SHEET AND MANUFACTURING METHOD

(71) Applicant: SCA Hygiene Products AB, Göteborg (SE)

(72) Inventors: Malkus Arlemark, Malmö (SE); Michael N Langmaid, Philadelphia, PA (US)

(73) Assignee: ESSITY HYGIENE AND HEALTH AKTIEBOLAG, Göteborg (SE)

(*) Notice: Subject to any disclaimer, the term of this patent is extended or adjusted under 35 U.S.C. 154(b) by 0 days.

(21) Appl. No.: 15/544,640

(22) PCT Filed: Jan. 29, 2015

(86) PCT No.: PCT/SE2015/050092
§ 371 (c)(1),
(2) Date: Jul. 19, 2017

(87) PCT Pub. No.: WO2016/122362
PCT Pub. Date: Aug. 4, 2016

(65) Prior Publication Data
US 2018/0014702 A1    Jan. 18, 2018

(51) Int. Cl.
A47K 10/00    (2006.01)
A47K 10/32    (2006.01)
A47K 5/12     (2006.01)

(52) U.S. Cl.
CPC ............. *A47K 10/32* (2013.01); *A47K 5/12* (2013.01); *A47K 2010/3233* (2013.01)

(58) Field of Classification Search
CPC .................... A47K 10/32; A47K 2010/3233
See application file for complete search history.

(56) References Cited

U.S. PATENT DOCUMENTS 1,615,968 A * 2/1927 Wakefield ............... A24F 19/02
                                                   131/240.1
7,192,102 B2 * 3/2007 Park ....................... D06F 39/005
                                                   312/228
(Continued)

FOREIGN PATENT DOCUMENTS

WO    WO-2014/185843 A1    11/2014

OTHER PUBLICATIONS

Colombian Office Action Oficio N° 8781 dated Jul. 12, 2018 issued in corresponding Colombian patent application No. NC2017/0007447 (17 pages) and its partial English-language translation thereof (8 pages).

*Primary Examiner* — Daniel J Rohrhoff
(74) *Attorney, Agent, or Firm* — Drinker Biddle & Reath LLP

(57) ABSTRACT

A dispenser for storing and dispensing a hygiene product, includes at least one wall having a support structure made at least mainly of plastic material, and at least one metal sheet attached on an outer side of the support structure. The at least one metal sheet includes a rim extending along at least a part of a peripheral side edge of the at least one metal sheet and a plurality of fastening tabs distributed around the peripheral side edge of the at least one metal sheet. The support structure includes at least one groove arranged to receive the rim and a plurality of apertures configured to receive the fastening tabs. Also, a method for manufacturing the dispenser, the support structure with groove and apertures as such, and the metal sheet with a rim and fastening tabs as such is disclosed.

27 Claims, 11 Drawing Sheets

(56) References Cited

U.S. PATENT DOCUMENTS

| | | | |
|---|---|---|---|
| 8,573,715 B1* | 11/2013 | Jackman | A47K 10/32 220/4.22 |
| 2005/0016230 A1 | 1/2005 | Lum et al. | |
| 2005/0206281 A1* | 9/2005 | Wen-Lung | G06F 1/181 312/265.5 |
| 2008/0203870 A1* | 8/2008 | Riley | A47J 31/44 312/265.6 |
| 2008/0257906 A1 | 10/2008 | Orgna | |
| 2009/0126176 A1* | 5/2009 | Kopf | F25D 23/02 29/243.5 |
| 2011/0024414 A1* | 2/2011 | Widmer | A47K 5/12 220/4.28 |
| 2012/0267387 A1* | 10/2012 | Omdoll | A47K 10/32 221/1 |
| 2016/0367088 A1* | 12/2016 | Allard | A47K 10/36 |

* cited by examiner

DISPENSER WITH METAL SHEET OUTER SURFACE, SUPPORT STRUCTURE, METAL SHEET AND MANUFACTURING METHOD

CROSS-REFERENCE TO PRIOR APPLICATION

This application is a § 371 National Stage Application of PCT International Application No. PCT/SE2015/050092 filed Jan. 29, 2015, which is incorporated herein in its entirety.

TECHNICAL FIELD

The disclosure relates to dispensers for storing and dispensing hygiene products, as well as associated supporting structures, manufacturing methods, and materials for making such dispensers.

The disclosure can be applied to all types of dispensers for hygiene products, such as absorbent sheet material, wiping material, liquids or foams of soap, alcohol gel, body or hair care products, or similar hygiene products.

Although the invention will be described with respect to a specific type of dispenser, the invention is not restricted to this particular dispenser, but may also be used in other dispensers for hygiene products.

BACKGROUND

There is a general desire to provide dispensers having robust designs and aesthetically pleasing appearance while still having a low manufacturing cost. Dispensers made of injection-moulded plastic material have the benefit of enabling relatively low manufacturing cost, low weight and a large freedom in terms of the design of the dispenser, such as complex three dimensional shaping, but plastic dispensers may be difficult to keep clean and disinfect due to scratches in the outer plastic surface and due to the limited types of cleaning liquid that can be used without damaging the outer plastic surface. Plastic dispensers are also generally perceived as less robust and of lower quality. Dispensers made of metal material, such as stainless steel, are generally more easily cleaned due to their hard outer surface that is scratch-resistant and due to the high compatibility with all types of cleaning liquids. Metal dispensers are also generally perceived as robust and of high quality. However, metal dispensers have a relatively high manufacturing cost. Attempts have been made to couple a metal sheet to an outer surface of a plastic cover of a dispenser. However, any exposed edges of the metal sheet may hinder proper use, cleaning or refilling of the dispenser. Moreover, the different thermal expansion coefficient between the metal sheet and the underlying plastic cover may for example result in deformation of the metal sheet in varying ambient temperature. There is thus a need for dispensers and related components and methods that address these and other drawbacks of conventional dispensers.

SUMMARY

It is desired to provide a dispenser for storing and dispensing a hygiene product, which dispenser includes at least one wall having a support structure made at least mainly of plastic material, and at least one metal sheet attached on an outer side of the support structure, wherein the above-mentioned disadvantage is at least partly avoided.

According to a first embodiment, the at least one metal sheet with a rim extends along at least a part of a peripheral side edge of the at least one metal sheet and a plurality of fastening tabs distributed around the peripheral side edge of the at least one metal sheet, and the support structure with at least one groove is arranged to receive the rim and a plurality of apertures configured to receive the fastening tabs.

By the provision of a rim on the edge of the metal sheet, and by the location of this rim within a groove of the plastic support structure, the potentially sharp edge of the metal sheet is effectively hidden and unexposed to a person using, cleaning or refilling the dispenser. The edge of the metal sheet is thus located within the groove, below an outer surface of the plastic support structure, and thus effectively within the wall of the support structure. This design prevents or at least reduces the risk that a person unintentionally comes into contact with an edge of the metal sheet. Furthermore, the bend of the metal sheet at the base of the rim, in combination with the rim extending into the groove, enhances the visual appearance of the outer surface of the dispenser in the edge regions of the metal sheet, by virtue of the concealment of the sharp metal edges.

According to a second embodiment, a method for manufacturing a dispenser for storing and dispensing a hygiene product includes:

forming at least one metal sheet, wherein the at least one metal sheet includes a rim extending along at least a part of a peripheral side edge of the at least one metal sheet and wherein a plurality of fastening tabs are distributed around the peripheral side edge of the at least one metal sheet;

forming a dispenser, wherein at least one wall of the dispenser includes a support structure made at least mainly of plastic material, and wherein the support structure has at least one groove arranged to receive the rim and a plurality of apertures configured to receive the fastening tabs; and attaching the at least one metal sheet to an outer side of the support structure.

The dispenser manufactured according to the method described above exhibits the same advantages in terms of improved perception of safety and visual appearance as described in relation to the dispenser of the first embodiment. A metal sheet component may be first die-cut out of metal sheet material, wherein the resulting flat metal sheet component includes material that is subsequently planned to form the fastening tabs and rim. After die-cutting, the flat metal sheet component may be metal formed between an upper and lower pressing die in a press machine for obtaining the desired shape of the metal sheet as such, as well as the inwardly folded rim and fastening tabs.

The dispenser may be manufactured in an injection-moulding process where one or more injected moulded components are assembled together into a complete plastic dispenser having a support structure ready to receive a metal sheet component. The groove and the apertures of the support structure are accomplished by means of corresponding protrusions in the injection-moulding tool. The metal sheet may then be attached to the support structure by inserting the fastening tabs into the corresponding apertures, and folding the fastening tabs on an inner surface of the fastening support structure for the purpose of positively locking the metal sheet to the support structure.

According to a third embodiment, a support structure for a dispenser for storing and dispensing a hygiene product includes at least a wall made at least mainly of plastic material and arranged for carrying a metal sheet attached to an outer side of the support structure. The support structure includes at least one groove arranged to receive a rim of the metal sheet, and a plurality of apertures located within the at least one groove and configured to receive a fastening tab of the metal sheet, wherein the groove at least partly, or even completely, encircles an outer side surface of the support structure that is arranged to be covered by the metal sheet.

The features of the third embodiment described above provides a support structure that, when assembled with a suitable metal sheet, as described above in the context of the first embodiment, has the same advantages as those described above in connection with the first embodiment.

According to a fourth embodiment, a metal sheet for forming an outer surface of a dispenser for storing and dispensing a hygiene product is arranged to be fastened to an outer side of a support structure of a dispenser wall, wherein the support structure is made at least mainly of plastic material.

The metal sheet includes a rim extending along at least a part of a peripheral side edge of the at least one metal sheet and a plurality of fastening tabs distributed around the peripheral side edge of the at least one metal sheet, wherein the rim is arranged to be installed in a groove of a support structure of the dispenser, and wherein the plurality of fastening tabs are arranged to be inserted into a plurality of apertures of the support structure for fastening the metal sheet to the support structure.

The features of the fourth embodiment described above provide a metal sheet that provides the advantages described above in connection with the first embodiment, when assembled with a suitable support structure.

According to a further embodiment of the dispenser, the dispenser may have a floating connection of the metal sheet to the support structure for enabling a certain degree of relative motion between the metal sheet and support structure due to different thermal expansion coefficients of the material of the metal sheet and the plastic material of the support structure. The floating connection reduces the likelihood for interference between the metal sheet and support structure that could result in deformation of the outer surface of the metal sheet, or lifting of the metal sheet from the support structure. Lifting, delamination or deformation of the metal sheet may result in a negative visual appearance and may also result in permanent damages of the dispenser and/or metal sheet. It is thus advantageous to avoid interference that can give rise to such negative results.

According to a further embodiment of the dispenser, a width of the groove may be in the range of 2-16 times larger, specifically in the range of 3-12 times larger, and more specifically in the range of 4-8 times larger, than a thickness of the metal sheet of the rim for enabling relative motion between the rim and groove in a direction perpendicular to an elongation direction of the groove due to different thermal expansion coefficients of the material of the metal sheet and the plastic material of the support structure. By designing the groove with a larger width than the thickness of the metal sheet of the rim, a play is provided for the rim within the groove. This play can be considered part of a floating connection of the metal sheet to the support structure. This play can advantageously be used for allowing relative motion between the metal sheet and underlying support structure with reduced risk for metal sheet deformation caused by interference between the edge of the metal surface and the side wall of the groove.

According to a further embodiment of the dispenser, a sideways play between each fastening tab and its respective aperture may be arranged such that a single region of the metal sheet forms a substantially fixed region with respect to the underlying support structure, and the remaining at least one region of the metal sheet forms a motion region that displays a greater relative motion with respect to the underlying support structure than the substantially fixed region upon variation in ambient temperature due to different thermal expansion coefficient of the material of the metal sheet and plastic material of the support structure. This arrangement ensures improved control of the relative motion of the metal sheet, and thereby prevents unintended large relative motion at undesirable locations.

According to a further embodiment of the dispenser, at least a portion of a fastening tab located within an aperture or groove of the support structure may be configured to deform to thereby enable relative motion between the metal sheet and support structure in a direction perpendicular to an elongation direction of the groove due to different thermal expansion coefficients of the material of the metal sheet and the plastic material of the support structure. By providing the dispenser with fastening tabs that are designed to controllably deform upon relative motion between the metal sheet and support structure, several advantages are achieved, such as enablement of a substantially play-free connection between the fastening tab and aperture for the purpose of avoiding undesirable rattle noise or motion of the metal sheet, and the possibility of reducing the degree of deformation of the metal sheet due to interference with the support structure for the purpose of avoiding lifting of the metal sheet away from the support structure, i.e. dislocation of the metal sheet from its desired position in full contact with the underlying support structure.

According to a further embodiment of the dispenser, the at least one metal sheet, the rim and the plurality of fastening tabs may be made of a single metal sheet. Producing the entire metal sheet with integrally formed rim and fastening tabs from a single metal sheet enables cost-effective manufacturing of the metal sheet.

According to a further embodiment of the dispenser, the rim may extend along at least 30% of the total peripheral side edge of the at least one metal sheet, specifically at least 50% of the total peripheral side edge of the at least one metal sheet, and more specifically at least 80% of the total peripheral side edge of the at least one metal sheet, and still more specifically over substantially the entire peripheral side edge of the at least one metal sheet. The extension length of the rim along the total peripheral side edge of the metal sheet may for example be 100%, i.e., extension of the rim along the entire peripheral edge. The visual appeal may be considered improved with increased amount of rim along the peripheral side edge of the at least one metal sheet. However, in certain cases the rim may be temporarily dispensed with for a certain segment of the metal sheet edge, for example if the certain segment cannot be reached by a user during normal operation of the dispenser, or if the segment is neither easily viewed nor readily exposed to a user's hands.

According to a further embodiment of the dispenser, the at least one metal sheet may include four peripheral side edges, and the rim extends along at least a part of each of the said four peripheral side edges, and specifically along a greater part of each of the said four peripheral side edges. An increased extension of the rim around the peripheral edge provides a more visually appealing dispenser because the amount of exposed metal edge is reduced.

According to a further embodiment of the dispenser, the dispenser may be configured to be mounted on a wall of an area, such as a bathroom, and the rim may extend at least along that portion of the peripheral side edge of the at least one metal sheet that is reachable by a user's hand when the dispenser is mounted on that wall. By ensuring that the rim extends at those locations where a user can access the edge of the metal sheet an improved perception of safety may be provided. Those areas of the metal sheet not accessible by a user after proper mounting, such as areas clamped between the dispenser and wall of the room, can be left without a rim if desired. Alternatively, the rim may extend along the entire edge of the metal sheet for improved visual appeal.

According to a further embodiment of the dispenser, the rim may be formed by plastic deformation of a peripheral side edge of the at least one metal sheet. As discussed above, manufacturing of the metal sheet by means of metal forming where the metal sheet is deformed by compressing the metal sheet between upper and lower dies provides a cost-effective process for manufacturing of the finished metal sheet component.

According to a further embodiment of the dispenser, an angle between an orientation of the rim and a plane of the metal sheet adjacent the rim may be in the range of 30-150 degrees, specifically 60-120 degrees, and more specifically 75-105 degrees. Said angle may be close to 90 degrees for enabling a maximal degree of flexibility and deformation upon relative motion between the metal sheet and support structure.

According to a further embodiment of the dispenser, the at least one metal sheet may have four corners, and the rim may be continuous at least at one of said four corners, and specifically at all of said four corners. A continuous corner may be desirable to enhance the perception of safety.

According to a further embodiment of the dispenser, at least one of the pluralities of fastening tabs, specifically a greater portion of the plurality of fastening tabs, and more specifically all of the plurality of fastening tabs may extend from an edge of the rim. Fastening tabs at the edge of the rim enable the metal sheet component to be cost-effectively manufactured with integrally formed fastening tabs by die-cutting from metal sheet.

According to a further embodiment of the dispenser, the at least one metal sheet may have four peripheral side edges, and each peripheral side edge may have at least one fastening tab. This design ensures that the metal sheet is fastened to the support structure at all four sides, thereby reducing the risk of lifting of the metal sheet from the support structure on any side of the metal sheet.

According to a further embodiment of the dispenser, the at least one metal sheet may be attached to the outer side of the support structure by means of the fastening tabs being inserted into the apertures and folded on an interior side of the support structure. This design enables a secure, strong and cost-efficient attachment of the metal sheet to the support structure, and enables the possibility of removing and replacing the metal sheet in case of damage, vandalism, or the like.

According to a further embodiment of the dispenser, at least one of the plurality of apertures may be located at least partly within the at least one groove. By placing the apertures within the groove the fastening tabs can be concealed to a large extent, thereby giving the appearance of a smooth outer surface of the metal sheet without visible through-holes.

According to a further embodiment of the dispenser, at least one entry of the plurality of apertures may be at least partly funnel shaped for simplifying insertion of the fastening tab into the aperture. The metal sheet may thus be mounted on the support structure in a slightly angled relative position.

According to a further embodiment of the dispenser, at least one of the plurality of apertures may have a varying internal gap width over the length of the aperture in a thickness direction of the support structure, and the internal gap width may be the smallest at an innermost portion of the at least one aperture. Consequently, the fastening tab will have the smallest degree of freedom at the innermost portion of the aperture, and a larger degree of freedom at other portions of the aperture. This is advantageous because the portion of the fastening tab located close to the rim is therefore located in the portion of the aperture with a larger degree of freedom, such that there is some space for the portion of the fastening tab located close to the rim to deform upon relative motion of the metal sheet and support structure. Without a space for deformation of the fastening tab the rim itself would have to be deformed to a larger extent upon that relative motion, thereby increasing the risk for deformation of the outer surface of the metal sheet, and possibly also lifting of the metal sheet from the support structure.

According to a further embodiment of the dispenser, at least one projecting rib may be provided in a side wall of at least one of the plurality of apertures, wherein the at least one projecting rib may be located at the most narrow location within the at least one aperture. The projecting rib enables use of a thicker and more robust injection-moulding tool in the area forming the aperture, thereby reducing the risk of tool breakage.

According to a further embodiment of the dispenser, the support structure may include at least one pocket located adjacent at least one of the plurality of apertures on the interior side of the support structure, and the at least one pocket may be arranged to receive the fastening tab after folding thereof. The pocket provides a certain level of protection against contact with the edge of a fastening tab, which may be desirable. The pocket enables the fastening tab to be sunk down into the material of the support structure surrounding the fastening tab.

According to a further embodiment of the dispenser, a sideways play of a first fastening tab and its aperture may be different from a sideways play of a second fastening tab and its aperture. A relatively small sideways play means the area of the metal sheet adjacent the associated fastening tab cannot move to any large degree upon relative motion between the metal sheet and support structure. A varying sideways play thus enables a designer to select which portion of the metal sheet that should be more fixed with respect to the support structure, and which portion of the metal sheet that should be more moveable with respect to the support structure.

According to a further embodiment of the dispenser, the at least one metal sheet may include at least four fastening tabs, and a sideways play between at least two of said fastening tabs and each respective aperture may be smaller than a sideways play between at least two other fastening tabs and each respective aperture. Similar to above, the smaller sideways plays of at least two of the fastening tabs enables provision of an extended substantially fixed region, such as across the metal sheet, all depending on the location of said at least two fastening tabs.

According to a further embodiment of the dispenser, said at least two fastening tabs having said smaller sideways play may be located on substantially opposite sides of the metal sheet. This arrangement of the at least two fastening tabs defines substantially a fixed region band across the metal sheet, wherein said band extends in a line between the two fastening tabs. This enables a more controlled relative motion between the metal sheet and the support structure.

According to a further embodiment of the dispenser, said at least two fastening tabs that have said smaller sideways play may be located in a centre region of each individual metal sheet edge. By locating said fastening tabs on opposite sides of the metal sheet and in a centre region of each individual metal sheet edge, the relative motion between the metal sheet and support structure is distributed equally on both sides of the centre region defined by said fastening tabs. This avoids one edge of the metal sheet exhibiting a significantly larger relative motion than other parts of the metal sheet, resulting in the avoidance of interference between the rim and the side wall of the groove.

According to a further embodiment of the dispenser, the rim over a majority of its peripheral extension around the metal sheet may protrude in the range of 0.3-8.0 millimeters measured from the inside of the metal sheet, specifically in the range of 0.5-5.0 millimeters, and more specifically in the range of 1.0-3.0 millimeters. The extension of the rim should be sufficient to enable the edge of the rim to project into the groove in a mounted position of the metal sheet, such that improved visual appearance is accomplished. There is however no need for any long extension into the groove as this only requires an even deeper groove and thus a relatively thick wall of the support structure, which would increase the cost of the dispenser.

According to a further embodiment of the dispenser, the metal sheet may have a thickness in the range of 0.2-1.5 millimeters, specifically in the range of 0.25-1.0 millimeter, and more specifically in the range of 0.3-0.7 millimeters. The thickness of the metal sheet is suitably chosen so as to provide an appropriate level of inherent stability while avoiding too thick of a dimension so as to minimize costs.

According to a further embodiment of the dispenser, inner side of the support structure may include a protrusion which is configured for enabling the fastening tab to be folded more than 90 degrees upon folding of the fastening tab.

Further advantages and advantageous features of embodiments of the invention are more fully explained in the following description and in the dependent claims.

BRIEF DESCRIPTION OF THE DRAWINGS

With reference to the appended drawings, below follows a more detailed description of embodiments of the invention cited as examples.

In the drawings.

DETAILED DESCRIPTION OF EXAMPLE EMBODIMENTS

Various aspects of the invention will hereinafter be described in conjunction with the appended drawings to illustrate and not to limit the invention, wherein like designations denote like elements, and variations of the inventive aspects are not restricted to the specifically shown embodiments, but are applicable to other variations of the invention. Further, while various features are grouped together in the embodiments for the purpose of streamlining the disclosure, it is appreciated that features from different embodiments may be combined to form additional embodiments that are all contemplated within the scope of the disclosure.

Figure 1:
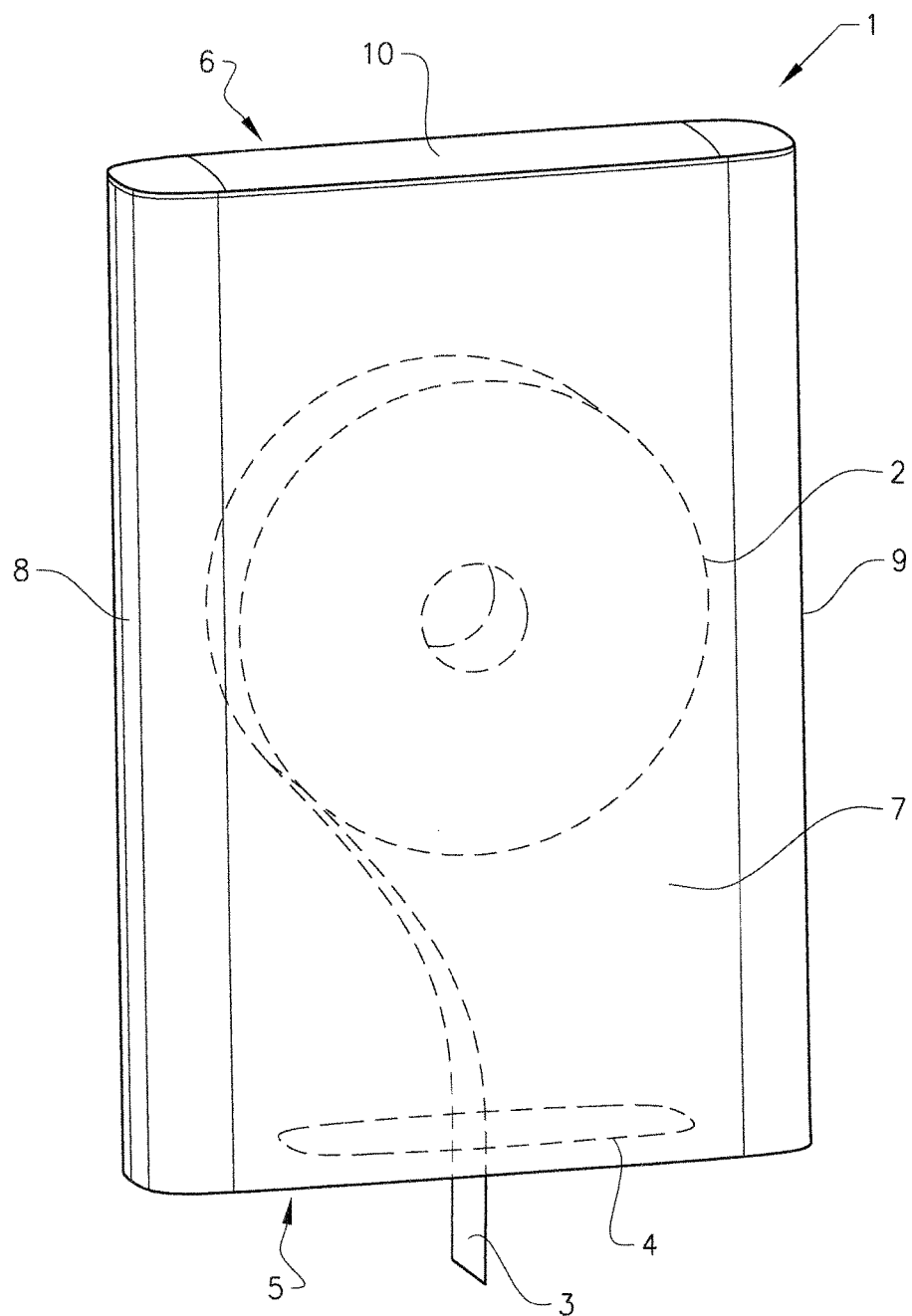
FIG. 1 is a perspective view of a dispenser.

FIG. 1 illustrates schematically a perspective view of a dispenser 1. The dispenser is schematically depicted in a closed state including a single roll 2 of sheet material having a leading end 3 projecting out of the dispenser 1 through a dispensing hole 4 in a bottom wall 5 of the dispenser 1. The single roll 2 of sheet material is typically rotatably mounted within the dispenser housing and the sheet material may for example include lines of weakening at repeating intervals for enabling individual segments of the sheet material to be separated from the roll and dispensed, with or without a tear bar including sharp projections located adjacent the dispensing opening 4.

The dispenser 1 additionally includes a rear wall 6, a front wall 7, two side walls 8, 9 and a top wall 10. The rear wall 6 of the dispenser is also referred to as a dispenser console and is intended to be fastened to a support structure, such as a wall in a bathroom. The front wall 7 of the dispenser is referred to as a dispenser cover. The dispenser further includes opening means for enabling opening of the dispenser 1 for refill of the dispenser 1 i.e., replacement of an empty roll with a new roll. For example, one moveable segment of the dispenser 1 may be pivotally attached to a fixed segment of the dispenser 1. The fixed segment may for example include the rear wall 6 or another fixed wall of the dispenser 1. The moveable segment may for example include the front wall 7, possibly including one or more of the side walls 8, 9, top wall 10 or bottom wall 5. The connection between the moveable segment and fixed segment may be formed by a pivotal connection, a sliding connection, a hook connection, a fastening means connection, a lock connection, or the like. No opening means of the dispenser 1 has been illustrated in the schematic figures.

The dispenser shown in FIG. 1 is only one example of an embodiment of the invention and many possible design variations are possible within the scope of the invention, both with respect to the design, form, shape, size, intended mounting position and the type of hygiene product that is intended to be dispensed from the dispenser, such as absorbent sheet material wound to form a roll (outer feed or centre feed), stacked absorbent sheet material (folded and stacked continuous sheet), stacked individual sheets (interfolded or non-interfolded), wiping material, liquids or foams of soap, alcohol gel, body or hair care products, or other hygiene products.

Figure 2:
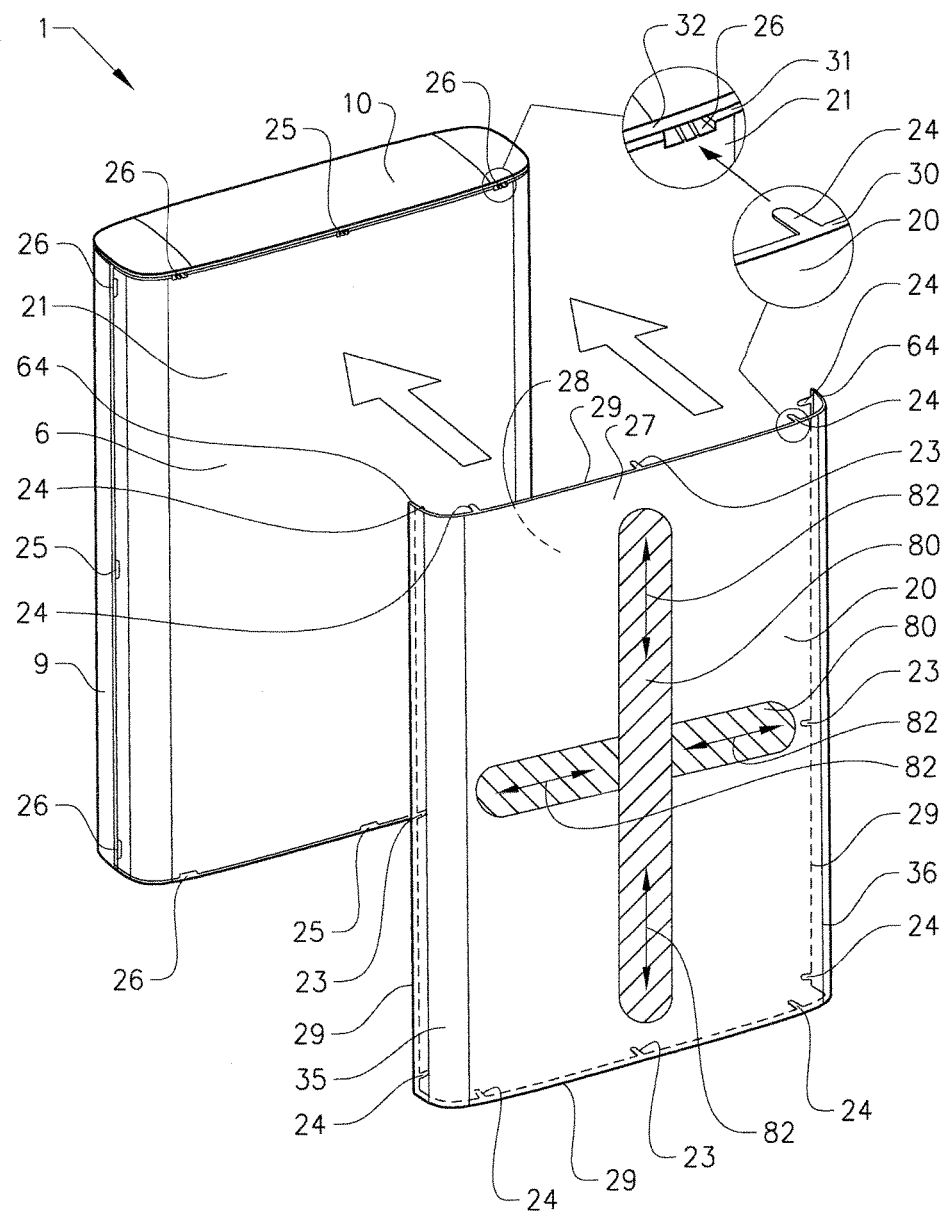
FIG. 2 is a perspective view of a dispenser before attaching the metal sheet to the support structure.

FIG. 2 shows a dispenser and a metal sheet. The dispenser 1 includes at least one wall having a support structure 21 made at least mainly of plastic material, and at least one metal sheet 20 intended to be attached on an outer side of the support structure 21. In FIG. 2, the rear wall 6 of the dispenser 1 is made of a mainly plastic support structure 21 intended to have the metal sheet 20 laminated to an outer side of the support structure 21. The mainly plastic support structure 21 may be a complete wall 6 made of plastic material or a framework of plastic material. If the support structure 21 is formed of a framework having holes and cavities within the support structure 21, less plastic material may be required, but the metal sheet 20 itself may possibly need a somewhat higher internal rigidity for avoiding deformation of the metal sheet 20 in the areas without direct underlying support from the support structure 21. The support structure 21 functions as a carrier for the metal sheet 20.

Since the underlying support structure 21 of the metal sheet 20 may be designed to provide the necessary strength and rigidity of the dispenser 1, the metal sheet 20 can be made relatively thin without having significant problems with stability or dents. The metal sheet 20 provides the dispenser 1 with an easily cleaned outer surface, as well as a perceived robust design and an aesthetic appearance, all while maintaining a relatively low manufacturing cost. The metal sheet 20 of the dispenser 1 makes the user perceive the dispenser 1 as being more or less completely made of metal, and consequently as a relatively robust and high quality dispenser. A dispenser 1 more or less completely made of metal may be less desirable, for example due to problems in assembling metal parts by welding, which often results in a less appealing surface finish of the dispenser, and being technically difficult to do for stainless steel. A metal dispenser is also relatively heavy and costly due to the material cost and is difficult to manufacture. Consequently, embodiments of the invention such as the example dispenser 1 combines the advantages of a plastic dispenser, such as being cost-effective in manufacturing and having low weight, with the advantages of a metal outer finish, such as a tough and easily cleaned outer surface, high scratch resistance, a durable and attractive appearance and an overall high exterior surface finish. The combination of a plastic supporting structure 21 of the dispenser 1 with the exteriorly mounted thin metal sheet 20 is realised by a cost-effective lamination process where the plastic support structure 21 and metal sheet 20 first are manufactured individually before being joined in a lamination process. Both the plastic dispenser support structure 21 and metal sheet 20 can be manufactured using manufacturing processes selected specifically for each part. The final lamination process of the pre-formed plastic dispenser and pre-formed metal sheet 20 may subsequently be easily and quickly performed.

The metal sheet 20 may be made of stainless steel due to its corrosion and stain resistance, lustre and low maintenance requirement. But, other metal materials may alternatively be used, such as aluminium alloys or more conventional steel alloys. If stainless steel is selected it may be advantageous to apply an anti-fingerprint coating to the metal sheet, or selecting a stainless steel grade having a fingerprint-resistant surface finish. The metal sheet has an outer side surface 27 that is adapted to face outwardly in a mounted state, and an inner side surface 28 that is intended to face the support structure of the dispenser wall, and a peripheral edge 29 where the inner and outer surfaces 27, 28 meet. The peripheral edge 29 thus surrounds the entire metal sheet 20. The metal sheet 20 can have a thickness in the range of 0.2-1.5 millimeters, specifically in the range of 0.25-1.0 millimeter, and more specifically in the range of 0.3-0.7 millimeters. The thickness of the metal sheet 20 is selected to provide an appropriate level of inherent stability while avoiding thick dimensions that would unnecessarily elevate costs. The preferred thickness depends on the material properties, such as tensile strength, modulus of elasticity and yield strength of the selected material, as well as on the design of the underlying support structure 21, and may be selected in accordance with the specific need.

The metal sheet 20 laminated to the support structure 21 can be made of a single piece of metal having a substantially constant material thickness. The metal sheet 20 may stretch over the entire height of the rear wall 6 of the dispenser 1, from the bottom wall 5 to the top wall 10, for the purpose of providing as much easily cleaned outer surface as possible and being economically feasible. Since it is complicated to manufacture and mount a metal sheet 20 that surrounds a plastic support structure 21 of a dispenser 1 on more than three sides, it is possible to use a plurality of covering metal sheets 20 that are attached to an outer surface of the support structure 21. For example, a combined front wall 7 and side walls 8, 9 metal sheet may be used together with a combined rear wall 6 and side walls 7, 8 metal sheet for enabling a complete enclosing of the plastic support structure 21 with a metal sheet outer cover. Alternatively, a front wall metal sheet may be combined with one or more of a rear wall metal sheets, side wall metal sheets, top wall metal sheet, or bottom wall metal sheet. Moreover, the metal sheet does not need to be folded to cover one or more side walls but can instead cover the front wall and at least one of the top wall 10 or bottom wall 5.

FIG. 2 shows a perspective view of a closed dispenser from a rear side, where the rear wall 6, a side wall 9, and top wall 10 are visible. The side walls 8, 9 are here illustrated as being divided into two halves, one half being integrally formed with the rear wall 6 and the other being integrally formed with the front wall 7. The top and bottom walls 10, 5 are here made of plastic material and joined with other parts to form the plastic dispenser that is subsequently at least partly covered with the metal sheet 20.

As shown in FIG. 2, the metal sheet 20 is intended to be fastened to the support structure 21 of the rear wall 6 of the dispenser 1 by means of a plurality of fastening tabs 23, 24 that engage corresponding apertures 25, 26 in the support structure 21. The metal sheet 20 also extends over part of the side wall 8, 9 for the purpose of providing more metal sheet covered outer surface of the dispenser 1 obviating the need for separate metal sheets for each dispenser wall. Extending the metal sheet 20 over a corner and on to a neighbouring wall of the dispenser 1 also eliminates the gap which otherwise would have been present if two separate neighbouring metal sheets were used. The omission of the gap is advantageous in terms of hygiene because a gap-less metal sheet can more easily be cleaned compared with two metal sheets having a gap there between.

The dispenser shown in FIG. 2 includes a metal sheet 20 laminated to the support structure 21 of the rear wall 6 and part of the side walls 8, 9. This could be combined with a metal sheet laminated to an outer surface of the front wall, and plastic non-laminated top and bottom wall. A metal sheet laminated to the front wall is not shown in FIG. 2 but is included in the scope of the invention.

According to an alternative design, the dispenser could instead be designed with rounded corners between one or more of rear wall 6 and top wall 10, rear wall 6 and bottom wall 5, front wall 7 and top wall 10, and/or front wall 7 and bottom wall 5. A single rear metal sheet 20 could then exhibit rounded upper and lower sides and be designed to cover the rear wall 6 and at least part of the top and bottom walls 5, 10. Similarly, a single front metal sheet 20 could then exhibit rounded upper and lower sides and be designed to cover the front wall 7 and at least part of the top and bottom walls 5, 10. This could advantageously be combined with plastic non-laminated side walls 8, 9 for enabling a purely cylindrical curvature of the metal sheet 20.

The combination of fastening tabs 23, 24 and apertures 25, 26 provide a mechanical fastening of the metal sheet 20 that is very robust and reliable over time. The fastening tabs 23, 24 also enable removal of the metal sheet 20 from the support structure 21 in case a metal sheet 20 has been damaged or must be replaced for any reason. The plurality of fastening tabs 23, 24 are distributed around the peripheral side edge 29 of the metal sheet 20 for increasing the likelihood that the edge 29 of the metal sheet 20 does not lift from the underlying support structure 21 i.e., avoiding the formation of a gap between the outer surface of the support structure 21, and the inner surface 28 of the metal sheet 20. Such a gap could be undesirable by exposing the edge 29 of the metal sheet 20 to a user of the dispenser 1.

For the purpose of providing the dispenser 1 with a high visual appeal, the edge 29 of the metal sheet 20 has been concealed while maintaining a very smooth and clean outer design of the dispenser 1. This has been realised by providing the metal sheet 20 with a rim 30 extending along the peripheral side edge 29 of the metal sheet 20 and by providing the support structure 21 with a groove 31 arranged to receive the rim 30 of the metal sheet 20. The rim 30 and groove 31 design enables a concealed solution of the edge 29 of the metal sheet 20 while enabling a flush transition between an outer surface 27 of the metal sheet 20 and an outer surface 32 of dispenser 1 adjacent the metal sheet 20 in a mounted state.

As used herein, the term "rim" refers to a portion of the metal sheet 20 that has been angled with respect to the main surface of the metal sheet 20 in a neighbouring area, and which is formed by folding the edge 29 of the metal sheet 20. The rim 30 is thus an edge portion of the metal sheet 20 that projects at an angle from the main surface of the metal sheet 20, which angle is offset from nil, and is in specific embodiments about 90 degrees.

As used herein, the term "groove" refers to a channel or trench in the outer surface of the support structure 21.

The metal sheet 20, the rim 30 and the plurality of fastening tabs 23, 24 may be made of a single source metal sheet. Producing the entire metal sheet 20 with integrally formed rim 30 and fastening tabs 23, 24 from a single source metal sheet enables cost-effective manufacturing of the metal sheet 20. The single piece metal sheet 20 may be manufactured in a metal forming process. The process may involve cutting a metal sheet piece from a metal sheet source material. The metal sheet piece is intended to form the metal sheet 20 including the rim 30 and the fastening tabs 23, 24. The metal sheet piece is subsequently formed in one or more metal forming steps, such as stamping process steps, and possibly folding steps for accomplishing the desired final form of the metal sheet 20. For example, the metal sheet 20 may be formed in a metal forming machine including upper and lower pressing dies for obtaining the desired shape of the metal sheet and the inwardly folded rim 30 and fastening tabs 23, 24. The rim 30 is thus formed by means of plastic deformation of a peripheral side edge 29 of the metal sheet 20. The plastic support structure 21 of the dispenser 1 can be manufactured by a conventional injection-moulding process where parts of the support structure 21 are manufactured individually and subsequently mounted to form a finished support structure 21. The manufacturing order for making the metal sheet and plastic support structure is irrelevant and could be reversed or made simultaneously.

Figure 3:
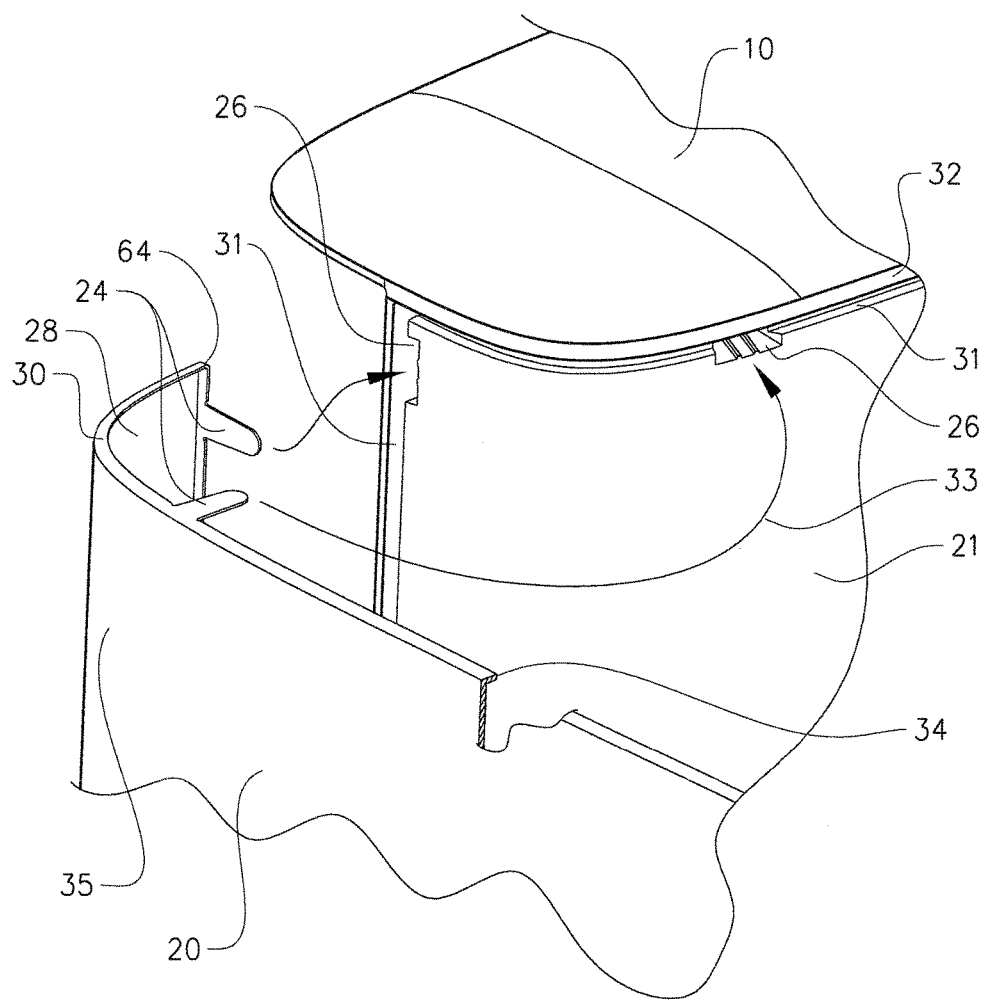
FIG. 3 is a detailed view of dispenser parts.

After manufacturing the plastic support structure 21 and metal sheet 20, these two parts are assembled to form a complete dispenser 1. The assembly process involves joining the metal sheet 20 and support structure 21 at such a relative orientation that the apertures 25, 26 of the support structure 21 receive the fastening tabs 23, 24 of the metal sheet 20. In case the metal sheet 20 has one or more rounded or folded portions, as shown in FIGS. 2 and 3, the fastening tabs 23, 24 may have to be inserted into the apertures 25, 26 in some specific order. For example, the apertures 25, 26 of the support structure 21 of a side wall 8, 9 in FIGS. 2 and 3 may first receive the corresponding fastening tabs 23, 24 while keeping the pre-formed metal sheet 20 slightly flattened from its natural curvature. Thereafter the metal sheet may be folded in towards the rear wall as depicted by arrow 33 in FIG. 3, for enabling the apertures 25, 26 of the support structure 21 of the rear wall 6 to receive their respective fastening tabs 24, 25, and finally inserting the remaining fastening tabs 23, 24 in the apertures 25, 26 of the support structure 21 of the opposite side wall 8, 9. Other mounting sequences of the metal sheet are possible within the scope of the invention, such as starting with the rear wall and subsequently inserting the fastening tabs in the side walls.

As described in more detail below, the apertures 25, 26 and fastening tabs 23, 24 may be provided with a shape and form for simplifying insertion of the fastening tabs 23, 24 into the apertures 25, 26. Moreover, the fastening tabs 23, 24 can be slightly deformable to enable insertion thereof into the corresponding apertures 25, 26 also when the fastening tabs 23, 24 and apertures 25, 26 are not perfectly aligned before mounting. Upon further insertion of the fastening tabs 23, 24 into the apertures 25, 26 the groove 31 of the support structure 21 will also receive the rim 30 of the metal sheet 20.

FIG. 3 shows a portion of the support structure 21 with groove 31 and apertures 26 of FIG. 2 in further detail, as well as a portion of the metal sheet 20 with the rim 30 and the fastening tabs 24. A front wall is no longer visible in FIG. 3, indicating that FIG. 3 illustrates a perspective view of the dispenser 1 in an open state from the rear side.

It can be clearly appreciated that the fastening tabs 24 extend from an edge 34 of the rim 30 i.e., they are essentially an elongation of the rim 30 in the form of fastening tabs 24. This design not only enables the metal sheet to be cost-effectively manufactured by metal forming from a metal sheet source material, but also permits the fastening tab 23, 24 to become concealed within the groove 31 to a large extent, such that a nearly invisible mounting of the metal sheet 20 is provided. There is also no need for forming fastening tabs from cut-outs in the visible outer metal sheet surface, such that a smooth, non-perforated and easily cleaned outer surface of the metal sheet 20 is provided.

The support structure 21 of the rear wall 6 essentially corresponds to the plastic dispenser rear 6 wall itself in this particular embodiment. The groove 31 is provided along a circumferential edge of the support structure 21 forming the rear wall 6 and part of the side walls 8, 9. A plurality of apertures 25, 26 with funnel-shaped openings are provided distributed along the length of the groove 31. The apertures 25, 26 are located at least partly within the groove 31 for receiving the fastening tabs 23, 24 projecting from the rim 30 of the metal sheet 20.

There is no need for an equal distribution of apertures 25, 26 along the length of the groove 31, but the location of the apertures 25, 26 is instead selected with the purpose of increasing the likelihood that the rim 30 of the metal sheet 20 during all operating conditions will remain within the groove 31, taking into account expected handling of the dispenser 1, aging of the dispenser 1, possible redundancy for handling breakage of a single fastening tab 23, 24, simplifying mounting of the metal sheet 20 to the support structure 21, and relative motion between the metal sheet 20 and plastic support structure 21 due to different thermal expansion coefficients of the metal sheet 20 and plastic support structure 21.

The metal sheet 20 shown in the embodiment of FIGS. 2 and 3 has a rectangular shape with curved side edges 35, 36 and four corners 64. The number of fastening tabs 23, 24 is selected for providing a sufficiently robust connection of the metal sheet 20 to the support structure 21, taking into account aspects like expected harshness level at intended installation environment, size and form of metal sheet 20, size and form of fastening tabs 23, 24, metal sheet thickness, or the like. According to one example shown in FIG. 2, the metal sheet 20 is provided with three fastening tabs 23, 24 on each side edge of the essentially rectangular metal sheet 20.

A specific problem associated with lamination of a metal sheet 20 to an underlying plastic support 21 is the different thermal expansion coefficients of the metal material of the metal sheet 20 and the plastic material of the support structure 21. The difference in thermal expansion coefficients results in relative motion between the metal sheet 20 and the support structure 21 during variation in ambient temperature. This relative motion can cause problems in terms of lifting of the metal sheet 20 from the underlying support structure 21 i.e., at least partial detachment of the metal sheet 20 from the support structure 21. The edge 29 of the metal sheet 20 may rise out from the groove 31, fastening tabs 23, 24 may be damaged, the metal sheet 20 may bulge, etc. For the purpose of reducing the likelihood of such problems, the dispenser 1 may be provided with a floating connection of the metal sheet 20 to the support structure 21.

Figure 4A:
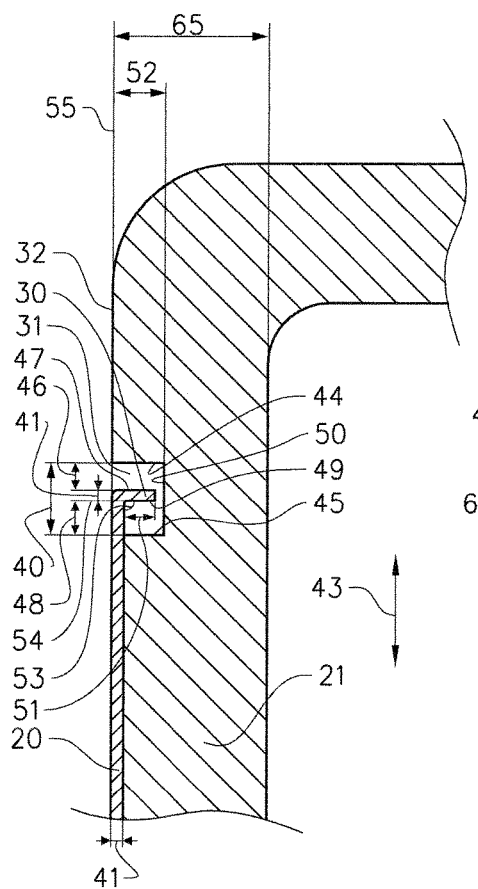
FIGS. 4A and 4B are cross-sections of a dispenser wall at a first ambient temperature.

The floating connection may be realised in various ways. For example, as shown in FIG. 4A, the width 40 of the groove 31 may be significantly larger than a thickness 41 of the metal sheet 20 at the rim 30. For example, the width 40 of the groove 31 may be in the range of 2-16 times larger, specifically in the range of 3-12 times larger, and more specifically in the range of 4-8 times larger, than a thickness 41 of the metal sheet 20 at the rim 30. This design enables a certain degree of relative motion between the rim 30 and the groove 31 in a width direction 43 i.e., a direction perpendicular to the elongation direction of the groove 31, such that the rim 30 does not immediately contact a side surface 44, 45 of the groove 31 upon relative motion. Contact between the rim 30 and a side surface 44, 45 of the groove 31 could result in the undesirable lifting or deformation of the metal sheet 20. This could also cause breakage of the plastic support structure 21.

The rim 30 may be located in a centre region of the groove 31 at an ambient temperature of about 20 degrees Celsius. This position of the rim 30 corresponds to the position shown in FIG. 4A, where a distance 46 between a first side surface 47 of the rim 30 and a first side surface 44 of the groove 31 is substantially equal to the distance 48 between a second side surface 49 of the rim 31 and a second side surface 45 of the groove 31.

FIG. 4A generally shows a cross-section of a support structure 21 of a wall of the dispenser having a metal sheet 20 laminated to an outer surface. The cross-section is perpendicular to the elongation direction of the groove 31 and is shown in a region around the rim 30 without a fastening tab 23, 24. The groove 31 is provided in the support structure 21 and the rim 30 of the metal sheet 20 protrudes into the groove 31. The groove 31 has a substantially rectangular shape and includes a first side surface 44, a second side surface 45, and a bottom surface 50 connecting the first and second side surfaces 44, 45. A first side surface 47 of the rim 30 faces the first side surface 44 of the groove 31 and the second side surface 49 of the rim 30 faces the second side surface 45 of the groove 31. The rim 30 protrudes a certain distance 51 measured from the inside 28 of the metal sheet 20, where distance 51 is selected to be smaller than the depth 52 of the groove 31 to avoid interference between the rim 30 and the groove 31.

The depth 52 of the groove 31 is smaller than the total thickness 65 of the support structure 21, and for example in the range of 20-80% of the total thickness 65, or specifically in the range of 30-70%.

The rim 30 of the metal sheet 20 may project substantially perpendicular to a plane 55 of the metal sheet 20 in the region adjacent to the rim 30, as shown in FIG. 4A. However, the angle 53 between an orientation 54 of the rim 30 and a plane 55 of the metal sheet 20 adjacent to the rim 30 can differ from about 90 degrees.

Figure 4B:
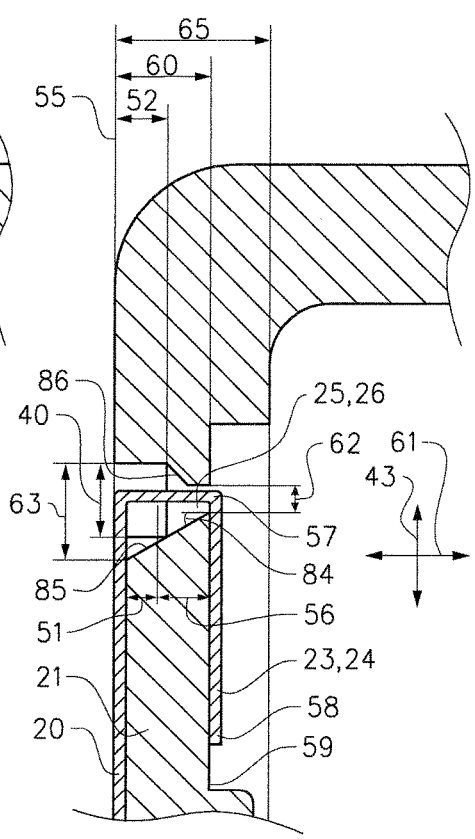

FIG. 4B shows a cross-section of the support structure 21 of the wall of the dispenser 1 at an ambient temperature corresponding to that of FIG. 4A, but in a region around the rim 30 having a fastening tab 24,25. The rim 30 protrudes a first distance 51 from the inner side 28 of the metal sheet 20. A first portion 56 of the fastening tab 24, 25 extends from the edge 34 of the rim to a fold line 57 of the fastening tab 23, 24 through the aperture 25, 26 formed in the support structure 21. The portion of the fastening tab 23, 24 extending beyond the fold line 57, and which has been folded flat against an inner side 59 of the support structure 21 for securing the metal sheet 20 to the support structure 21, is herein referred to as the second portion 58 of the fastening tab.

The aperture has a varying internal gap width over the length 60 of the aperture 25, 26 in a thickness direction 61 of the support structure 21. The internal gap width 63 at an outermost portion of the aperture 25, 26 is larger than the internal gap width 62 at an innermost portion of the aperture 25, 26, such that the fastening tab 23, 24 will have the smallest degree of freedom in a width direction 43 at said innermost portion of the aperture 25, 26, and a larger degree of freedom in the width direction 43 at other portions of the aperture 25, 26. The width direction 43 is within the plane 55 of the metal sheet 20 and extends perpendicular to the elongation direction of the groove 31 at the region of the aperture 25, 26. Thereby, the level of play between the fastening tab 23, 24 and the aperture 25, 26 in the width direction 43 is smallest at said innermost portion. The innermost portion thus effectively defines an anchoring position of the metal sheet 20 because this part of the metal sheet 20 will remain substantially fixed irrespective of ambient temperature. The relative motion between the metal sheet 20 and support structure 21 is thus near nil at said anchoring position upon variation in ambient temperature. It is thus mainly the first portion 56 of the fastening tab 23, 24 that will function as a flexible coupling member that deforms for enabling relative motion between the metal sheet 20 and support structure 21 without, or at least with only minimal, deformation of the metal sheet 20 itself. From a functional view the first portion 56 of the fastening tab 23, 24 functions substantially as a link arm with pivotal connection to the edge 34 of the rim 30 and the innermost portion of the aperture 25, 26.

The design, shape and form of the aperture 25, 26 and the varying internal gap width can be selected according to the specific needs of the intended use. For example, the gap width can be arranged to vary in a continuous and/or stepwise manner along the thickness direction of the support structure 21. In the design shown in FIG. 4B, which merely represents one example embodiment, an innermost side wall 85 is continuously inclined with an angle 84 in the range of 10-50 degrees with respect to the thickness direction 61 and the outermost side wall 86 is partly continuously inclined with a similar angle.

Figures 5A, 5B:
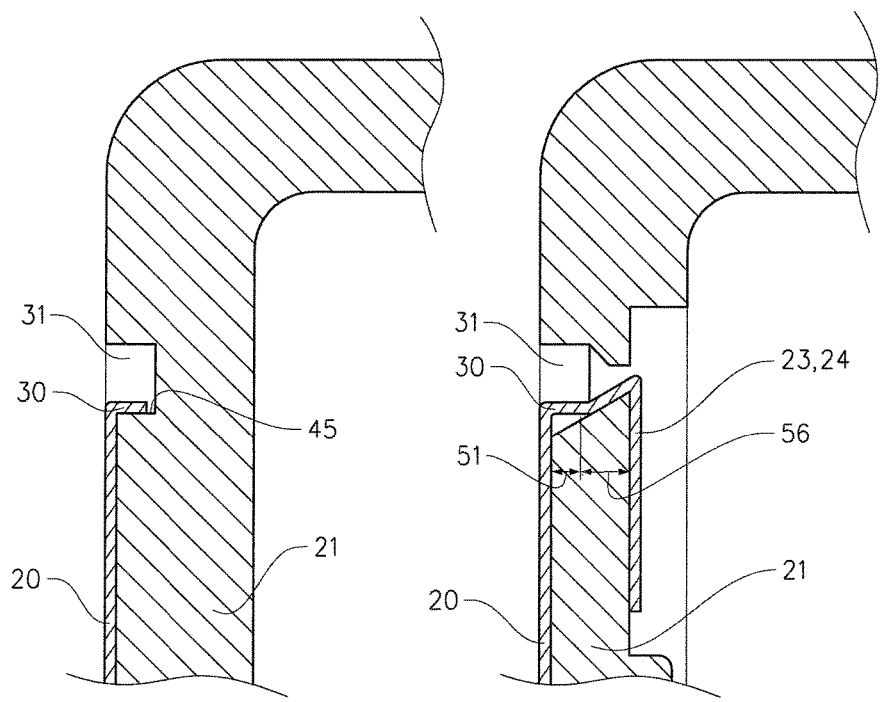
FIGS. 5A and 5B are cross-sections of a dispenser wall at a second ambient temperature.

FIGS. 5A and 5B illustrate the relative position of the metal sheet 20 and support structure 21 at a relatively high ambient temperature. The plastic support structure 21 has expanded to a larger degree then the metal sheet 20, such that the rim 30 of the metal sheet 20 just comes into contact with the second side surface 45 of the groove 31, as shown in FIG. 5A. The second side surface 45 of the groove here corresponds to the side surface positioned closest to the centre of the metal sheet 20. Relative motion between the metal sheet 20 and support structure 21 up to this ambient temperature can thus be facilitated without any significant negative consequences, such as a distorted metal sheet 20. FIG. 5B shows the deformation of the fastening tab 23, 24 at the same ambient temperature. The rim 30 has not been deformed at all in the illustrated state of the metal sheet 20, and only the first portion 56 of the fastening tab 23, 24 has been deformed for adapting to the new relative position. The fastening tab 23, 24 and aperture design is thus arranged to compensate for the new relative position between metal sheet 20 and support structure 21 without resulting in distortion of the visible part of the metal sheet 20.

Figures 6A, 6B:
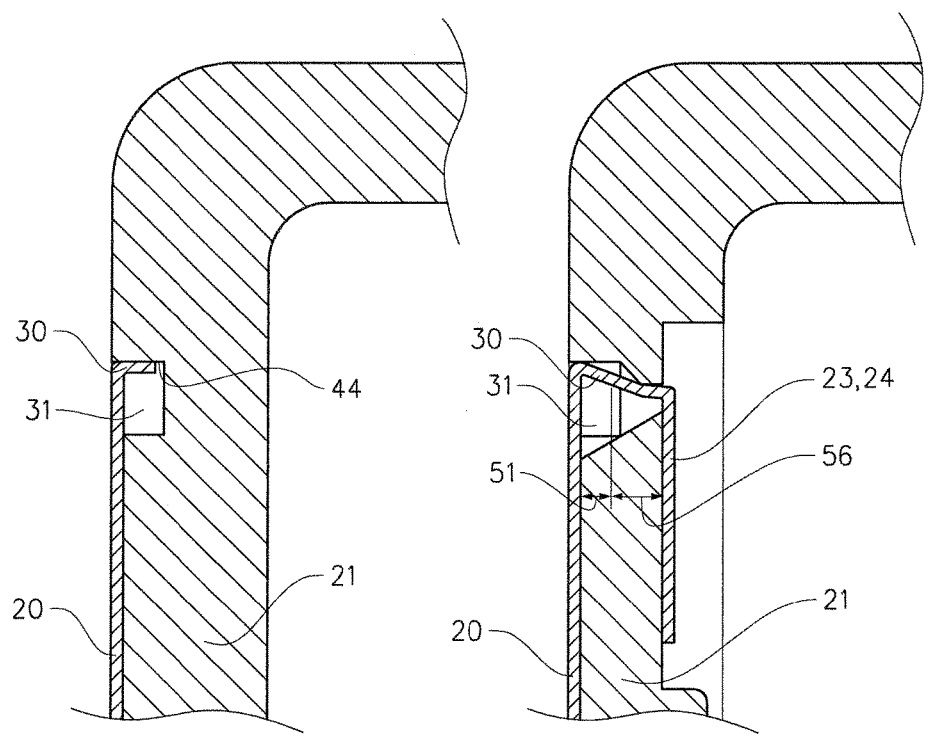
FIGS. 6A and 6B are cross-sections of a dispenser wall at a third ambient temperature.

FIGS. 6A and 6B illustrate the relative position of the metal sheet 20 and support structure 21 at a relatively low ambient temperature. The plastic support structure 21 has contracted to a larger degree than the metal sheet 20, such that the rim 30 of the metal sheet 20 just comes into contact with the first side surface 44 of the groove 31, as shown in FIG. 6A. The first side surface 44 of the groove 31 here corresponds to the side surface positioned further away from the centre of the metal sheet 20. Relative motion between the metal sheet 20 and support structure 21 down to this ambient temperature can thus be facilitated without any significant negative consequences, such as a visibly distorted metal sheet 20. FIG. 6B shows the deformation of the fastening tab 23, 24 at the same ambient temperature. Both the rim 30 and the first portion 56 of the fastening tab 23, 24 have been partly deformed in the illustrated state of the metal sheet 20 in compensating for the new relative position. The rim 30, fastening tab 23, 24 and aperture design is thus arranged to compensate for the new relative position between metal sheet 20 and support structure 21 without any major distortion of the visible metal sheet 20. A small deviation in the orientation of the rim 31 in the region surrounding the fastening tab 23,24 compared with the orientation of the rim 30 in a region without a fastening tab 23, 24, such as shown in FIG. 6A, may be visible in the region surrounding the fastening tab 23, 24.

Other designs of the fastening tab 23, 24 and aperture 25, 26 may be used for realising the desired floating connection of the metal sheet 20 to the support structure 21. For example, the fastening tab 23, 24 may be provided with a varying external extension in the width direction 43 over the length of the fastening tab in the thickness direction 61 of the fastening tab 23, 24 in combination with a more or less constant internal gap width of the aperture 25, 26 along the thickness direction 61 of the support structure 21, such that the desired link arm with a substantially pivotal connection between the edge 34 of the rim 30 and innermost portion of the aperture 25, 26 is accomplished.

Still another design could be a sliding engagement of the fastening tab 23, 24 to the aperture 25, 26, such that the fastening tab 23, 24 no longer deforms for compensating for the relative motion between the metal sheet 20 and support structure 21. Instead, a sliding motion takes place between the fastening tab 23, 24 and the aperture 25, 26. This may for example be accomplished by providing the aperture 25, 26 with a minimum internal gap width equal to the gap width of the groove, thereby enabling the fastening tab 23, 24 to displace within the aperture 25, 26 without deformation. The sliding design potentially has the disadvantage of not necessarily providing a well-defined position of the metal sheet 20, which therefore may adopt to a position offset from a position corresponding to a centre of the area enclosed by the groove 31.

Figures 7A, 7B:
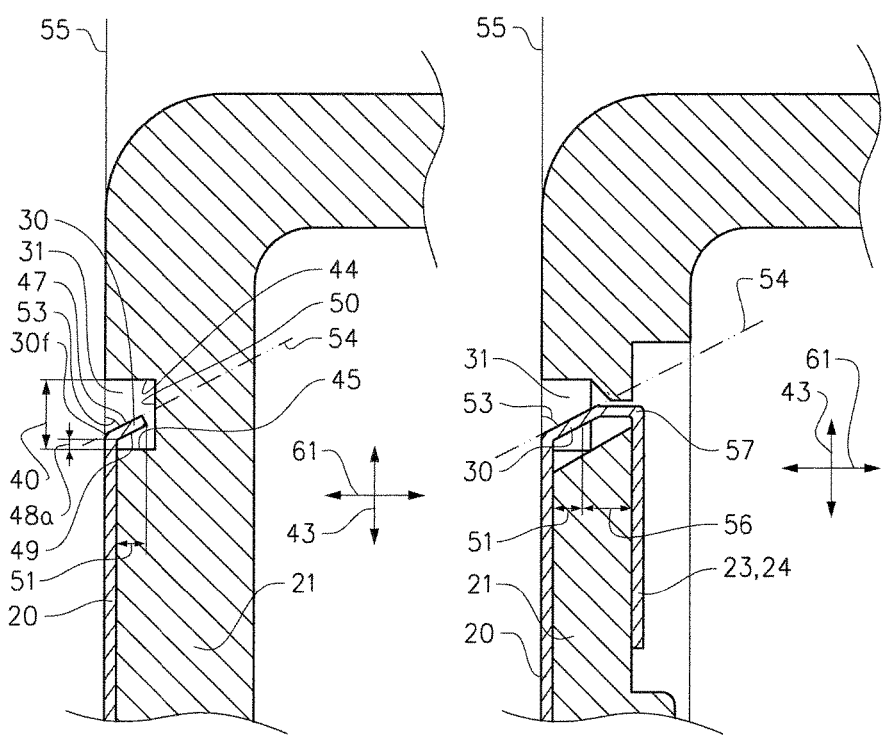
FIGS. 7A and 7B are cross-sections of an alternative embodiment of a dispenser wall at a first ambient temperature.

FIG. 7A generally shows a cross-section of an alternative embodiment of a support structure 21 of a wall of the dispenser having a metal sheet 20 laminated to an outer surface. The cross-section corresponds to the cross-section of FIG. 4A but with an alternative design of the rim 30. In this embodiment the angle 53 between the orientation 54 of the rim 30 and a plane 55 of the metal sheet 20 adjacent the rim 30 differs from about 90 degrees, and is more in the range of 50-80 degrees, specifically in the range of 60-80 degrees and more specifically about 70 degrees. The rim 30 is oriented towards an outer peripheral side of the metal sheet 22, meaning that the angle 53 of the rim 30 is defined by the orientation of the rim 30 before and after folding thereof. Consequently, a fold line 30f defining one edge of the rim 30 is located closer to the second side surface 45 of the groove than edge 34 of the rim 30, which is located closer to the first side surface 44 of the groove 31.

A distance 48a between the fold line 30f and second side surface 45 of the groove 31 in the width direction 43 may be selected such that the edge 34 of the rim 30 becomes positioned in a centre region of the groove 31 in the width direction 43. The inclined design of the rim enables a more forgiving result in terms of metal sheet deformation, delamination, or load to the plastic support structure 21 in case the distance 48a between the fold line 30f and second side surface 45 of the groove 31 becomes nil or even negative, compared with a design where the angle 53 is about 90 degrees. The design with an outwardly inclined rim consequently provides a more forgiving design in case the second side surface 49 of the rim 31 contacts the second side surface 45 of the groove 31. Alternatively, the metal sheet 20 may be configured such that the distance 48a is substantially half the width 40 of the groove 31 at about 20 degrees Celsius.

FIG. 7B shows a cross-section of the support structure 21 of the wall of the dispenser 1 at an ambient temperature corresponding to that of FIG. 7A, but in a region around the rim 30 having a fastening tab 24,25. The rim 30 protrudes a first distance 51 from the inner side 28 of the metal sheet 20. The first portion 56 of the fastening tab 24, 25 extends from the edge 34 of the rim to a fold line 57 of the fastening tab 23, 24 through the aperture 25, 26 formed in the support structure 21. The first portion 56 of the fastening tab may be designed to extend essentially in the thickness direction 61 of the support structure 21 for simplifying insertion of the fastening tab 23, 24 into the aperture 25, 26 before folding of the fastening tab 23, 24.

A metal sheet 20 may include a single type of floating connection on all sides, or it may include a first type of floating connection on one or more sides of the metal sheet 20 and a second type of floating connection on one or more sides of the metal sheet 20.

Figure 8:
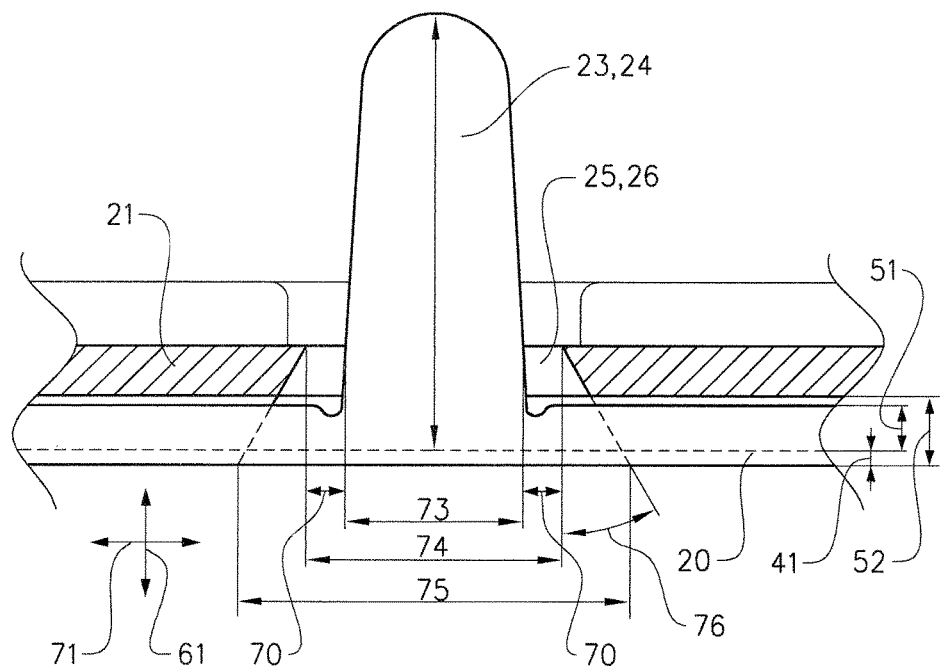
FIG. 8 is a cross-section of a wall of a dispenser in a region of a fastening tab.

The disclosure above in FIGS. 4a-7b is concerned with the floating connection of the metal sheet 20 to the support structure 21 in a direction perpendicular to the elongation of the groove 31. However, the metal sheet 20 will also experience a relative motion component parallel to the elongation of the groove 31 as soon as the metal sheet 23, 24 has a form that differs from a pure circular shape. FIG. 8 shows an embodiment adapted for compensating for said relative motion component parallel to the elongation direction 71 of the groove 31. The compensation is realised by having sideways play 70 between the fastening tab 23, 24 and aperture 25, 26 in the elongation direction 71 of the groove 31 in the region of the associated fastening tab 23, 24. The sideways play 70 is realised by setting the maximal outer length 73 of the fastening tab located within the aperture 25, 26, in the elongation direction 71 of the groove 31, smaller than the minimum internal length 74 of the aperture 25, 26, in the elongation direction 71 of the groove 31. Thereby sideways play 70 is ensured, such that relative motion also in the elongation direction 71 of the groove can be compensated for.

The sideways play 71 may be substantially equal at all fastening tabs 23, 24 around a metal sheet 20. Having substantially equal sideways play 71 at all fastening tabs 23, 24 may however result in relatively large relative motion occurring at undesirable locations, and that the relative motion is less equally distributed over the area of the metal sheet 20. This problem can be solved according to an embodiment, in that a sideways play 70 between each fastening tab 23, 24 and its respective aperture 25, 26 is arranged such that a single region of the metal sheet 20 forms a substantially fixed region with respect to the underlying support structure 21, and the remaining at least one region of the metal sheet 20 forms a motion region that displays a greater relative motion with respect to the underlying support structure 21 than the substantially fixed region upon variation in ambient temperature.

A sideways play 70 in the range of 0.1-2.0 millimeters, specifically in the range of 0.1-1.0 millimeter, can typically define a small sideways play 70. The sideways play 70 may even be nil i.e., a press-fit between the fastening tab 23, 24 and aperture 25, 26 in the elongation direction 71 of the groove 31 i.e., the sideways direction.

The sideways play 70 for a non-small sideways play fastening tab 23, 24 can be considerably larger because there is no desire for any sideways play restrictions in the elongation direction 71 of the groove 31. For example, the sideways play 70 may be at least 3.0 millimeters, specifically at least 2.0 millimeters.

A substantially fixed region can be realised by providing one or more selected fastening tabs 23, 24 with a smaller sideways play 70 than other fastening tabs 23, 24. Thereby, those fastening tabs 23, 24 having smaller sideways play 70 jointly define the substantially fixed region due to their inability to compensate for relative motion in the elongation direction 71 of the groove 31. The location of the relative motion of the metal sheet 20 with respect to the support structure 21 is thereby better controlled, such that an improved or desired distribution of relative motion can be realised.

For example, the central fastening tabs 23 on each side edge of the metal sheet 20 in FIG. 2 are provided with a smaller sideways play 70 than the remaining fastening tabs 24 of the metal sheet 20 when the metal sheet 20 is mounted to support structure 21. This arrangement ensures that the central portion of each side edge 29 of the metal sheet 20 will exhibit a smaller relative motion than other parts of the metal sheet 20 simply due to its inability to displace in said central portions.

Since one fastening tab 23 with smaller sideways play 70 may be provided on each side of the metal sheet 20, two pairs of oppositely located fastening tabs 23 will be provided. Each of said two pairs define substantially fixed regions 80 stretching over the surface of the metal sheet 20 from one side to the opposite side i.e., between the location of the fastening tabs 23 with smaller sideways play 70. In FIG. 2 the two substantially fixed regions 80 are located centrally, partly overlapping and perpendicular to each other. There will be a certain level of relative motion also in the substantially fixed region but only in a direction 82 parallel to the elongation direction of the substantially fixed region 80 itself.

FIG. 8 shows a cross-section through an aperture with a fastening tab 23, 24 inserted into the aperture 25, 26 but not yet folded. The length of the fastening tab 23, 24 is in the range of 4-50 millimeters, specifically in the range of 6-25 millimeters for having sufficient length to enable simple folding of the fastening tab 23, 24 on the inner side 59 of the support structure 21 without requiring unnecessary amounts of material.

The aperture 25, 26 can have a varying internal length in the elongation direction 71 of the groove 30, over the length of the aperture 25, 26 in the thickness direction 61 of the support structure 21, with a larger gap length 75 at the entry side of the fastening tab 23, 24. This design provides a funnel-shaped entry for the fastening tab 23, 24 when viewed in a cross-sectional plane of the support structure in a direction perpendicular to the width direction 43, as illustrated in FIG. 8.

Figure 9:
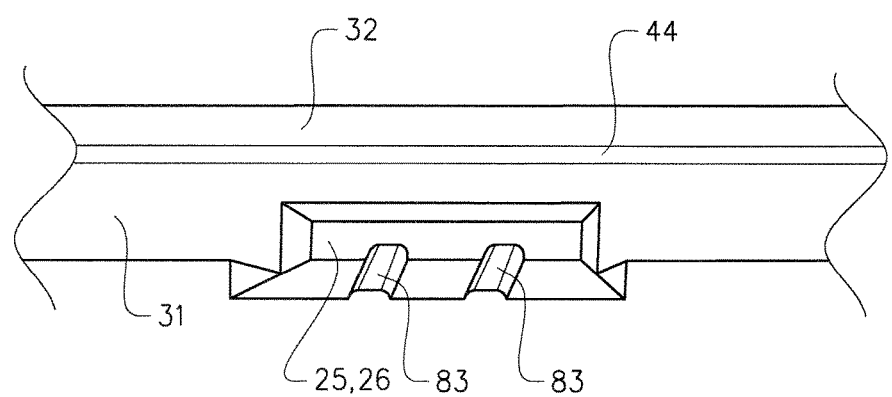
FIG. 9 is a perspective view of an aperture from an outer side of a support structure.

FIG. 9 illustrates a perspective view of an aperture 25, 26 of the support structure 21. The aperture 25, 26 is located in the groove 31, and is funnel-shaped for simplifying entry of the fastening tab 23, 24 from an outer side of the support structure 21. Two projecting ribs 83 are also provided in the innermost side wall 85 of the aperture 25, 26. The projecting ribs 83 are located at the narrowest location within the at least one aperture 25, 26 and enables use of a thicker and more robust injection-moulding tool in the area forming the aperture 25, 26, thereby reducing the risk for tool breakage. A single projecting rib 83, or more than two ribs 83, could of course alternatively be provided.

Figure 10A:
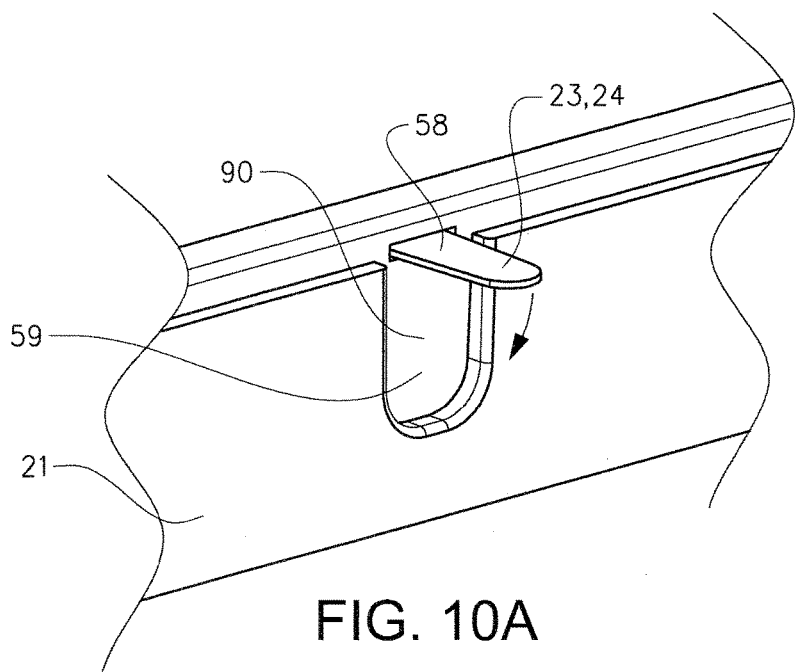
FIGS. 10A and 10B are perspective views of a fastening tab before and after folding thereof.
Figure 10B:
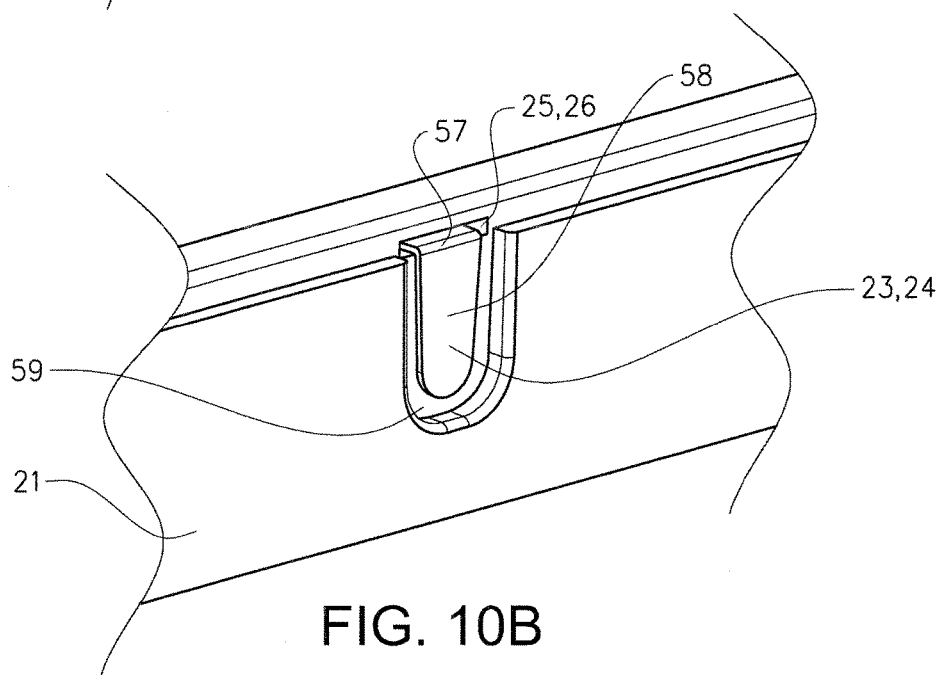

FIGS. 10A and 10B show the orientation of the fastening tab 23, 24 on the inside of the support structure 21 upon mounting of the metal sheet 20 to the support structure 21. After insertion of the fastening tab 23, 24 through the aperture 25, 26 the second portion 58 of the fastening tab 23, 24 extending out on the inside of the support structure 21 is folded flat against the inner side 59 of the support structure 21. The fold line 57 of the fastening tab 23, 24 in the folded position of the fastening tab 23, 24 will be defined by the inner edge of the aperture 25, 26. The size, shape, form and strength of the fastening tab 23, 24 is suitably selected to enable manual folding by a person assembling the metal sheet 20 onto the support structure 21. The location of the aperture 25, 26 and surrounding structure can be selected to enable adequate access to the fastening tab 23, 24 on the inside of the support structure 21. The foldable fastening tab 23, 24 enables a secure, strong and cost-efficient attachment of the metal sheet 20 to the support structure 21, as well as the possibility of removing and replacing the metal sheet 20 in case of damage, vandalism, or the like.

As shown in FIGS. 10A and 10B, the support structure 21 includes a pocket 90 located adjacent to the aperture 25, 26 on the inner side 59 of the support structure 21. The pocket 90 is arranged to receive the fastening tab 23, 24 after folding thereof, such that a user or service personnel is prevented from easily contacting the folded fastening tab 23, 24. The pocket 90 thus provides a certain level of protection against inadvertent contact with the folded fastening tab 23, 24. The pocket 90 may have a substantially similar form and shape as the fastening tab 23, 24, as shown in FIGS. 10A and 10B. Alternatively, the pocket 90 may be larger. The pocket 90 may alternatively be formed of one or more barriers located on the inner side 59 of the support structure 21 and projecting inwardly. The barriers may be located so as to surround the fastening tab 23, 24 in its folded position, such that a user or service personnel cannot easily unintentionally come in contact with the fastening tab 23, 24 in the folded position.

The metal sheet 20 is positively locked to the underlying support structure 21 by folding the fastening tabs 23, 24 on an inner surface of the fastening support structure. The fastening tab 23, 24 may be folded downward towards the inner surface of the support structure 21 manually, such that the fastening tab is folded approximately 90 degrees. During folding the fastening tab 23, 24 may experience a combination of plastic and elastic deformation, and the elastic deformation may then result in a certain level spring back effect of the fastening tab 23, 24, i.e. that the fastening tab 23, 24 to a small extent tends to return to its original non-folded position a small amount from the most folded position. Therefore, even if the fastening tab 23, 24 is folded substantially flat against the inner side 59 of support structure 21, the tip of the fastening tab 23, 24 may lift up from the inner side 59, for example about 0.5 millimeters. Therefore, the barrier or pocket 90 should be greater than the sheet metal thickness to avoid a user from unintentional contact with the fastening tabs 23, 24

Figure 11:
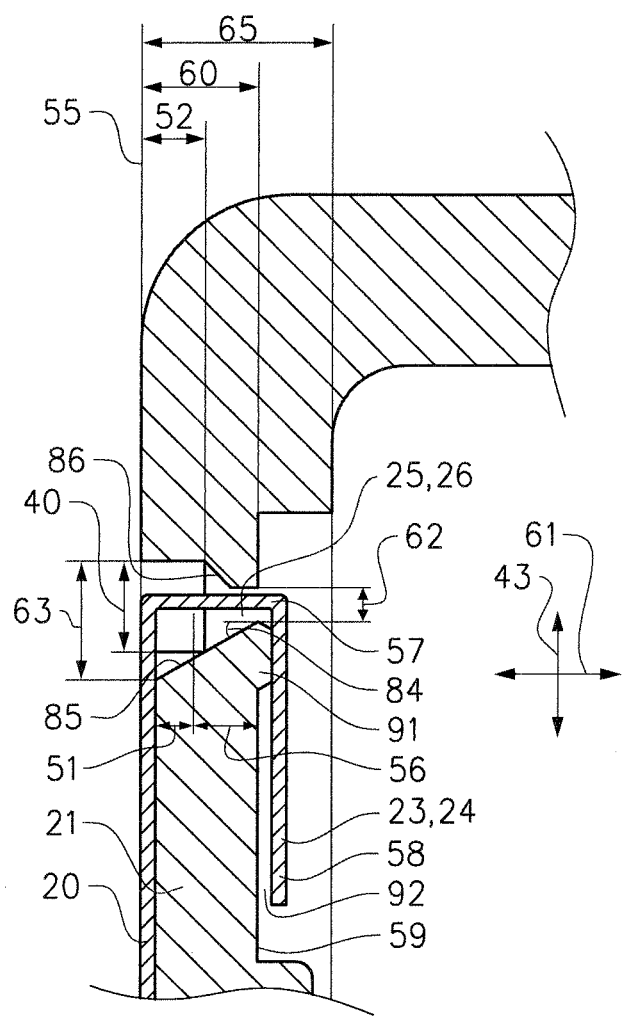
FIG. 11 is a cross-section of a dispenser wall with a protrusion at ambient temperature.

One solution for avoiding, or at least reducing, excessive spring back effect of the fastening tab 23, 24 upon release of the fastening tab 23, 24 after folding thereof is to provide some type of protrusion 91 on the inner side 59 of the support structure, as shown in FIG. 11. By locating the protrusion 91 close to the intended fold line 57 of the fastening tab 23, 24, at least a portion of the fastening tab 23, 24 can initially be folded more than 90 degrees before the tip of the fastening tab 23, 24 contacts the inner side 59. In this position, the fastening tab 23, 24 is located in an overbend area 92. Upon release of the folding force the fastening tab 23, 24 may spring back a certain amount, such that the fastening tab 23, 24 after spring back extends substantially parallel with the inner surface 59 of the support structure 21. This substantially parallel configuration of the fastening tab 23, 24, which corresponds to the new natural state of the fastening tab 23, 24, is shown in FIG. 11. The provision of the protrusion 91 thus enables the fastening tab 23, 24 to attain a more parallel configuration, such that the depth of any pocket 90 or protective barriers may be reduced, and/or the risk that a tip of the fastening tab 23, 24 protrudes out from the pocket 90 or barrier is reduced.

The protrusion 91 may take nearly any form, such as rib, ridge, bump, or the like. The height of the protrusion in the thickness direction 61 of the support structure 21 may for example be in the range of 0.1-3.0 millimeters and specifically in the range of 0.4-1.0 millimeter, depending on the material properties of the fastening tab 23, 24. The length of the protrusion 91 in the width direction 43 may for example be in the range of 0.2-5 millimeters, specifically in the range of 0.5-3 millimeters.

The depth of the pocket 90 or projecting height of the barriers may be selected such that unintentional contact with the folded fastening tab 23, 24 is largely avoided also after a certain spring back of the fastening tab 23, 24 upon folding thereof. For example, the depth of the pocket 90 or projecting height of the barriers may be selected in the range of 2-10 times the thickness 41 of the metal sheet 20, specifically in the range of 2-5 times the thickness 41 of the metal sheet 20.

Figure 12:
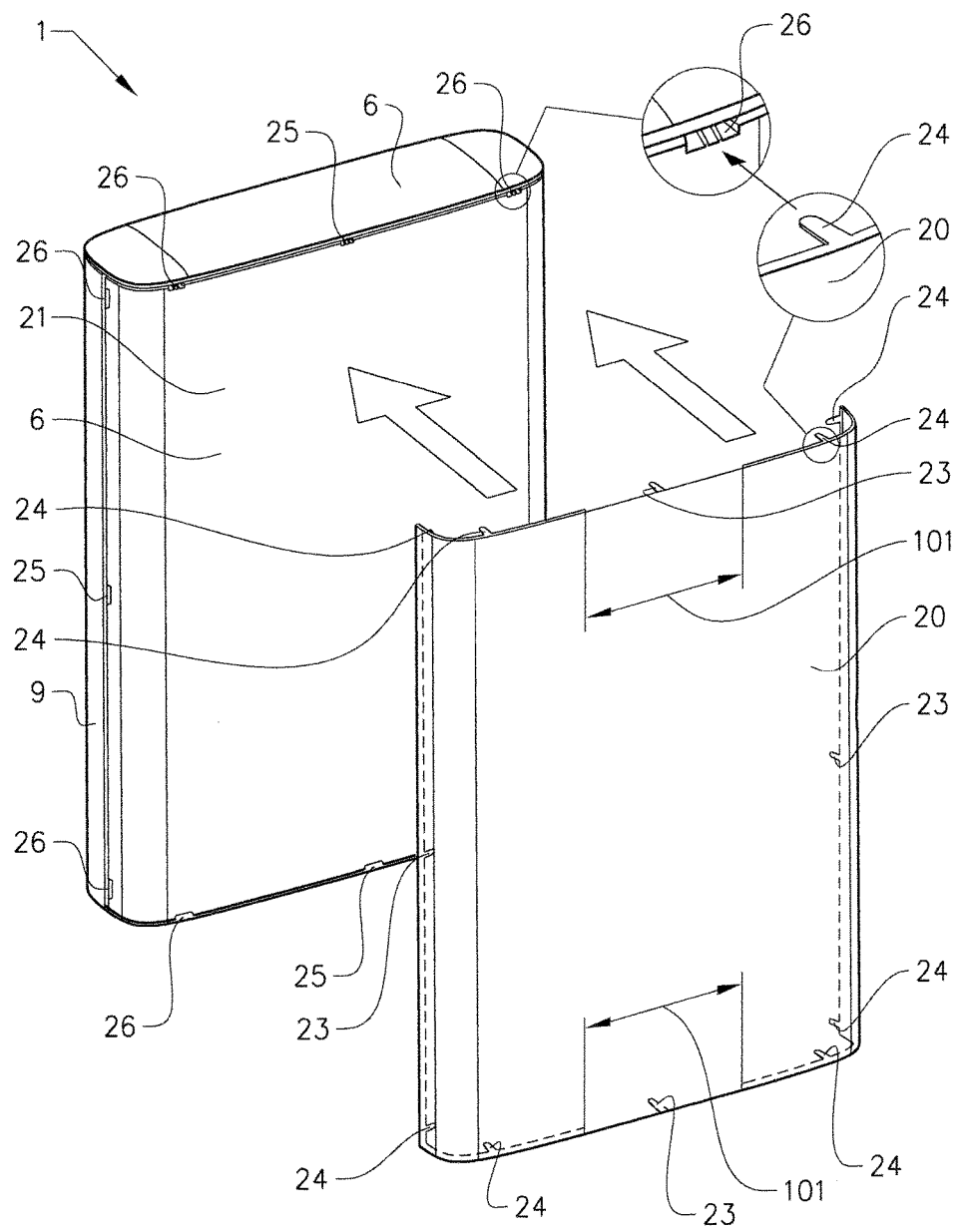
FIG. 12 is a perspective view of the metal sheet having a portion without the rim.

The rim 30 of the metal sheet 20 may extend along the entire peripheral edge 29 of the metal sheet 21 for providing a perceived safe and visually attractive metal covered dispenser 1. The extension 8 of the rim 30 along the total peripheral edge 29 of the metal sheet 20 may for example be 100% i.e., the rim 30 extends along the entire peripheral edge 29. However, the rim 30 may be omitted from the peripheral edge 29 of the metal sheet 20 at certain locations if desired. FIG. 12 shows an embodiment of the dispenser 1 in which the rim 30 is omitted a certain distance 101 along the top and bottom edges 29 of the metal sheet 20. Omission of the rim 30 may result in simplified manufacturing of the metal sheet 20. However, the location for omitting the rim 30 can be selected such as to avoid reduced visual appeal of the dispenser. In FIG. 12, the location where the peripheral edge 29 of the metal sheet 20 does not exhibit a rim 30 is located on the rear wall 7 i.e., in areas not easily or frequently viewed after proper mounting of the dispenser 1.

It is to be understood that the present invention is not limited to the embodiments described above and illustrated in the drawings; rather, the skilled person will recognize that many changes and modifications may be made within the scope of the appended claims. It is appreciated that various features of the above-described examples can be mixed and matched to form a variety of other alternatives. As such, the described embodiments are to be considered in all respects only as illustrative and not restrictive.

The invention claimed is:

1. A dispenser for storing and dispensing a hygiene product, comprising:
   at least one wall having a support structure made at least mainly of plastic material; and
   at least one metal sheet attached on an outer side of the support structure, including:
   a rim extending along at least a part of a peripheral side edge of the at least one metal sheet; and
   a plurality of fastening tabs distributed around the peripheral side edge of the at least one metal sheet,
   wherein the support structure includes at least one groove arranged to receive the rim and a plurality of apertures configured to receive the fastening tabs.

2. A dispenser according to claim 1, further comprising a floating connection of the metal sheet to the support structure for enabling a certain degree of relative motion between the metal sheet and support structure due to different thermal expansion coefficients of the material of the metal sheet and the plastic material of the support structure.

3. A dispenser according to claim 1, wherein a width of the groove is in the range of 2-16 times larger than a thickness of the metal sheet of the rim for enabling relative motion between the rim and groove in a direction perpendicular to an elongation direction of the groove due to different thermal expansion coefficients of the material of the metal sheet and the plastic material of the support structure.

4. A dispenser according to claim 1, wherein a sideways play between each fastening tab and its respective aperture is arranged such that at least one region of the metal sheet forms a substantially fixed region with respect to the support structure, and a remaining at least one region of the metal sheet forms a motion region that displays a greater relative motion with respect to the support structure than the substantially fixed region upon variation in ambient temperature due to different thermal expansion coefficients of the material of the metal sheet and plastic material of the support structure.

5. A dispenser according to claim 1, wherein at least a first portion of the fastening tab located within an aperture or groove of the support structure is arranged to deform for enabling relative motion between the metal sheet and support structure in a direction perpendicular to an elongation direction of the groove due to different thermal expansion coefficients of the material of the metal sheet and the plastic material of the support structure.

6. A dispenser according to claim 1, wherein the at least one metal sheet, the rim, and the plurality of fastening tabs are made of a single metal sheet.

7. A dispenser according to claim 1, wherein the rim extends along at least 30% of the total peripheral side edge of the at least one metal sheet.

8. A dispenser according to claim 1, wherein the at least one metal sheet includes four peripheral side edges, and the rim extends along at least a part of each of said four peripheral side edges.

9. A dispenser according to claim 1, wherein the dispenser is configured to be mounted on a wall of an area, and wherein the rim extends at least along that portion of the peripheral side edge of the at least one metal sheet that is reachable by a user's hand when the dispenser is mounted on said wall.

10. A dispenser according to claim 1, wherein the rim has been formed by plastic deformation of a peripheral side edge of the at least one metal sheet.

11. A dispenser according to claim 1, wherein an angle between an orientation of the rim and a plane of the metal sheet adjacent the rim is in the range of 30-150 degrees.

12. A dispenser according to claim 1, wherein the at least one metal sheet includes four corners, and wherein the rim is continuous at at least one of said four corners.

13. A dispenser according to claim 1, wherein at least one of the plurality of fastening tabs extends from an edge of the rim.

14. A dispenser according to claim 1, wherein the at least one metal sheet includes four peripheral side edges, and wherein each peripheral side edge includes at least one fastening tab.

15. A dispenser according to claim 1, wherein the at least one metal sheet is attached to the outer side of the support structure by the fastening tabs being inserted into the apertures and folded on an interior side of the support structure.

16. A dispenser according to claim 1, wherein at least one of the plurality of apertures is located at least partly within the at least one groove.

17. A dispenser according to claim 1, wherein at least one entry of the plurality of apertures is at least partly funnel shaped for simplifying insertion of the fastening tab into the aperture.

18. A dispenser according to claim 1, wherein at least one of the plurality of apertures has a varying internal gap width over the length of the aperture in a thickness direction of the support structure, and wherein the internal gap width is smallest at an innermost portion of the at least one aperture.

19. A dispenser according to claim 1, wherein at least one projecting rib is provided in a side wall of at least one of the plurality of apertures, and wherein the at least one projecting rib is located at the most narrow location within the at least one aperture.

20. A dispenser according to claim 1, wherein the support structure includes at least one pocket located adjacent to at least one of the plurality of apertures on an inner side of the support structure, and wherein the at least one pocket is arranged to receive the fastening tab after folding thereof.

21. A dispenser according to claim 1, wherein a sideways play of a first fastening tab and its aperture is different from a sideways play of a second fastening tab and its aperture.

22. A dispenser according to claim 1, wherein the at least one metal sheet includes at least four fastening tabs, and wherein a sideways play between at least two of said fastening tabs and each respective aperture is smaller than a sideways play between at least two other fastening tabs and each respective aperture.

23. A dispenser according to claim 22, wherein said at least two fastening tabs having said smaller sideways play are located on substantially opposite sides of the metal sheet.

24. A dispenser according to claim 22, wherein said at least two fastening tabs having said smaller sideways play are located in a centre region of each individual metal sheet edge.

25. A dispenser according to claim 1, wherein the rim over a majority of its peripheral extension around the metal sheet protrudes in the range of 0.3-8.0 millimeters measured from the inside of the metal sheet.

26. A dispenser according to claim 1, wherein the metal sheet has a thickness in the range of 0.2-1.5 millimeters.

27. A dispenser according to claim 1, wherein an inner side of the support structure comprises a protrusion which is configured for enabling the fastening tab to be folded more than 90 degrees upon folding of the fastening tab.

\* \* \* \* \*